(12) United States Patent
Delorme (10) Patent No.: US 9,098,761 B2
(45) Date of Patent: Aug. 4, 2015

(54) PROTECTION DEVICE, ELECTRONIC PAYMENT TERMINAL AND MAGNETIC READING HEAD CORRESPONDING THERETO

(75) Inventor: Jean-Jacques Delorme, Saint-Marcel-lès-Valence (FR)

(73) Assignee: INGENICO GROUP, Paris (FR)

( * ) Notice: Subject to any disclaimer, the term of this patent is extended or adjusted under 35 U.S.C. 154(b) by 221 days.

(21) Appl. No.: 13/876,707

(22) PCT Filed: Aug. 30, 2011

(86) PCT No.: PCT/EP2011/064929
§ 371 (c)(1),
(2), (4) Date: Jun. 24, 2013

(87) PCT Pub. No.: WO2012/041623
PCT Pub. Date: Apr. 5, 2012

(65) Prior Publication Data
US 2013/0270345 A1    Oct. 17, 2013

(30) Foreign Application Priority Data
Sep. 30, 2010  (FR) ..................................... 10 57889

(51) Int. Cl.
*G06K 7/00* (2006.01)
*G06K 7/08* (2006.01)
*G06F 21/75* (2013.01)

(52) U.S. Cl.
CPC ................ *G06K 7/082* (2013.01); *G06F 21/75* (2013.01); *G06K 7/084* (2013.01)

(58) Field of Classification Search
CPC ........ G06K 7/082; G06K 7/084; G06K 7/087
USPC ........................................................... 235/449
See application file for complete search history.

(56) References Cited

U.S. PATENT DOCUMENTS

| 5,861,662 | A  | * | 1/1999 | Candelore ..................... 257/679 |
| 5,998,858 | A  | * | 12/1999 | Little et al. .................... 257/678 |
| 6,646,565 | B1 | * | 11/2003 | Fu et al. ........................ 340/687 |
| 6,830,182 | B2 | * | 12/2004 | Izuyama ........................ 235/449 |
| 6,853,093 | B2 | * | 2/2005 | Cohen et al. .................. 257/678 |
| 2005/0219728 | A1 | * | 10/2005 | Durbin et al. .................. 360/46 |
| 2006/0049255 | A1 | * | 3/2006 | von Mueller et al. ......... 235/449 |
| 2008/0265032 | A1 |   | 10/2008 | Horiguchi et al. |
| 2008/0315989 | A1 |   | 12/2008 | Mirkazemi-Moud et al. |

OTHER PUBLICATIONS

International Search Report dated Nov. 20, 2011 for corresponding International Application No. PCT/EP2011/064929, filed Aug. 30, 2011.

(Continued)

*Primary Examiner* — Daniel Hess
(74) *Attorney, Agent, or Firm* — David D. Brush; Westman, Champlin & Koehler, P.A.

(57) ABSTRACT

A protection device is provided, which includes a detection circuit for detecting a short-circuit between at least two output branches of a magnetic reading head. Each of the output branches is able to convey a signal read by the reading head on a track of a magnetic card and the detection circuit is able to detect a short-circuit during the reading of at least one track of a magnetic card.

13 Claims, 5 Drawing Sheets

(56) References Cited

OTHER PUBLICATIONS

French Search Report dated Jan. 24, 2011 for corresponding French Application No. 1057889, filed Sep. 30, 2010.

English Translation of the Written Opinion of the International Searching Authority dated Nov. 20, 2011 for corresponding International Application N. PCT/EP2011/064929, filed Aug. 30, 2011.

* cited by examiner

Fig. 4b ized as WO 2012/041623 on Apr. 5, 2012,
PROTECTION DEVICE, ELECTRONIC PAYMENT TERMINAL AND MAGNETIC READING HEAD CORRESPONDING THERETO

CROSS-REFERENCE TO RELATED APPLICATIONS

This application is a Section 371 National Stage application of International Application No. PCT/EP2011/064929, filed Aug. 30, 2011, which is incorporated by reference in its entirety and published as WO 2012/041623 on Apr. 5, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of payment terminals.

More specifically, the disclosure pertains to payment terminals accepting magnetic cards. This type of payment card is very widespread, especially outside the European region. There is therefore a major need for terminals adapted to this type of payment card.

BACKGROUND OF THE DISCLOSURE

It can be seen that the installed terminals for payment by magnetic cards are poorly resistant to fraud. In the most frequent type of attack, an attacker obtains access to the electrical signals coming from the magnetic reading head of such a terminal by a simple electrical connection of a parasitic device. The information obtained during the reading of a magnetic card, possibly added to the PIN (personal identification number) code of the card, enables relatively easy fraudulence, given the ease with which this information is then copied into a new magnetic track. Indeed, numerous low-cost and freely available devices enable the creation of new magnetic cards with the desired information.

Thus, it is easy to obtain fraudulent, physical or virtual replicas of the payment cards read by an attacked payment terminal, and this can be done without the knowledge of the owner of the payment card used, the payment terminal manufacturer and the banking services with which the payment terminal is linked.

This problem has been singled out by the standardization organization PCI PTS, which, in its revision No. 3, reports an increase in "potential attacks" against signals from the magnetic head, and therefore recommends an increase in protection measures against fraudulence on the magnetic heads of such terminals.

Furthermore, while it is known that the installation of a parasitic device on the terminal can result in a temporary interruption of a signal output from the reading head of a terminal, it is nevertheless difficult to detect the presence of such a device once it is installed.

There is therefore a proven need for novel payment terminals that are adapted to the use of magnetic cards and give better protection to the possessors of magnetic payment cards.

SUMMARY

The inventors have observed that an attempt to install a parasitic device on the output branch of a reading head of an electronic payment terminal often results in a short-circuit between at least two output branches of the reading head of this terminal. Indeed, since the distance between the tracks coming from the magnetic head is very small (of the order 0.15 mm) it is frequent for the attacker to cause a short-circuit in the terminal by adding his own tracks.

Consequently, an exemplary embodiment of the invention pertains to a protecting device including detection means for detecting a short-circuit between at least two output branches of a magnetic reading head. According to an embodiment of the invention, each of said output branches is capable of conveying a signal read by said reading head on a track of a magnetic card and said detecting means are capable of detecting a short-circuit during the reading of at least one track of a magnetic card.

This is a major advantage as compared with the prior art.

Indeed, certain solutions of the prior art focus on monitoring breaks in the electrical signals output from the reading head. Consequently, when an attack causes a short-circuit at the output of the reading head of a terminal, this terminal is simply considered to be transiently out of operation since, once the short-circuit is removed, the working of the terminal seems to be normal. Consequently, the installation of the parasitic terminal will go unnoticed and its presence will then be undetectable.

An embodiment of the invention on the contrary makes it possible to detect the presence of a short-circuit which will result, for example, in a voltage whose level is excessively low or excessively high as compared with a preliminarily defined threshold value at the output branches of the reading head.

Thus, an embodiment of the invention enables the detection of an attempt to connect a parasitic device.

According to one particular characteristic of an embodiment of the invention, said detecting means include means for comparing a signal picked up at said output branches with at least one first reference signal.

This mode of implementing the invention makes it possible, through simple and low-cost means, to report the occurrence of an event representing a first type of attack.

According to one particular characteristic of an embodiment of the invention, said detecting means include means for superimposing a DC component on at least one signal generated by said reading head on at least one of said output branches.

The use of a DC component makes it possible to be free of the fluctuations proper to an AC signal and therefore to have available an even more reliable for detecting an attack.

In one particular embodiment of the invention, said means for superimposing enable a permanent superimposing of said DC component.

Thus, it is possible to detect an attack even when it occurs when the terminal is not connected, especially before delivery, or when it is in transit.

According to one particular characteristic of an embodiment of the invention, the protecting device furthermore includes means for perceiving a deterioration of at least one output branch of said reading head.

An embodiment of the invention especially makes it possible to highlight a break, for example a cut, in one of the output branches.

According to one particular characteristic of an embodiment of the invention, said means for perceiving include means for comparing a signal picked up on an output branch with at least one second reference signal.

This mode of implementation of an embodiment of the invention makes it possible, through simple and low-cost means, to report the occurrence of an event representing a second type of attack.

According to one particular characteristic of an embodiment of the invention, with said first and second reference signals taking the form of first and second reference voltages, the second reference voltage has a value greater than that of the first reference voltage.

This variant of the invention makes it possible to define a nominal range of voltage in which a voltage measured at output of the reading head must be situated if the conditions of operation of the reading head are normal. On the contrary, a case of the voltage measured at the output of the reading head being outside this nominal range will be symptomatic of an attack.

According to another aspect, an embodiment of the invention pertains to an electronic payment terminal including a magnetic reading head provided with at least two output branches and one processing unit comprising means for processing at least one output signal generated by said reading head. According to an embodiment of the invention, such a terminal furthermore includes a protecting device according to an embodiment of the invention.

Thus, an embodiment of the invention proposes a payment terminal capable of detecting an attack on said reading head in a novel manner.

According to one particular characteristic of an embodiment of the invention, said means for processing comprise means for filtering said generated signal.

According to one particular characteristic of an embodiment of the invention, said means for filtering are capable of eliminating a DC component from said generated signal.

Thus, the DC component will not disturb the decoding of the output signal.

According to one particular characteristic of an embodiment of the invention, said terminal furthermore comprises means for reacting in the event of detection of a short-circuit between at least two of said output branches and/or of perception of a deterioration of one of said output branches, identified as an attack, by said protecting device.

According to one particular characteristic of an embodiment of the invention, said means for reacting comprise at least one of the means belonging to the group comprising:
  means for memorizing said attack;
  means of dissuasion capable of dissuading the insertion of a magnetic card;
  means for limiting the capacities of operation of said reading head;
  means for generating an alarm on said terminal or to a controlling third party;
  means for sending at least one piece of sensitive data to a controlling third party. Thus, an embodiment of the invention makes it possible to counter the attack by limiting its possibilities of causing harm and/or by alerting a controlling third party.

According to one particular characteristic of an embodiment of the invention, said at least one piece of sensitive data belongs to the group comprising:

a piece of data relating to at least one payment card inserted into said terminal during or after said attack;
  a timestamp of the attack;
  an identification of the tradesman having custody of said terminal;
  an address of said tradesman;
  a serial number of said terminal;
  a piece of information identifying the manufacturer or a manager of said terminal.

An embodiment of the invention makes it possible especially, during each reading of a card, to transmit, to a controlling third party, the information obtained after decoding of the signals generated by the reading head of the attacked terminal so that the potentially copied cards can be disabled.

It also makes it possible to provide the information necessary for identifying and locating the attacked terminal.

According to one particular characteristic of an embodiment of the invention, said magnetic reading head comprises at least two output branches connected to said processing unit and situated on an implantation layer, at least one of said output branches being situated on an accessible face of said implantation layer and being fixedly attached to a protective strip at least partially covering said other output branches so as to hide them from view and limit access to them.

Thus, according to an embodiment of the invention, any infringement on said strip will give rise to a modification of its electrical characteristics which will induce a variation of the signal produced on said other output branch making it possible to reveal an attempt to access said at least one output branch that it is protecting.

An embodiment of the invention therefore proposes to use certain output branches of the reading head to protect others. This solution therefore provides for a reduction in the number of conductive tracks needed, which has the advantage of minimizing the amount of space required by the layer needed for assembling the components and therefore reducing its complexity and size as well as the cost price of the terminal.

Thus, in this embodiment, the invention makes available a twofold protection against attacks: protection firstly by meshing (or shielding) of the output branches conveying a sensitive signal and secondly by the presence of a protecting device which detects an abnormal variation of a signal.

According to one particular characteristic of an embodiment of the invention, said protecting device is included in said processing unit and said other branch provides a reference signal to said protecting device.

In this embodiment, the invention thus further minimizes the complexity of the terminal and therefore the associated costs of manufacture and makes the protecting device invisible so as to more easily trap attackers.

According to yet another aspect, an embodiment of the invention pertains to a magnetic reading head comprising at least two output branches connected to a processing unit and situated on an implantation layer.

According to an embodiment of the invention, at least one of said output branches is situated on a face accessible to said implantation layer and is fixedly attached to a protective strip at least partially covering said other output branches so as to keep them hidden from view and limit access to them.

Thus, an infringement of said strip will cause a variation of the signal produced by said other output branch.

In other words, an embodiment of the invention pertains to a magnetic reading head comprising at least three output branches, two of said output branches being connected to a processing unit and being covered by a rigid conductive material connected to a processing unit and having circumvolutions intended to cover said two output branches.

According to an embodiment of the invention, said rigid material comprises said third output branch.

BRIEF DESCRIPTION OF THE DRAWINGS

Other characteristics and advantages shall appear more clearly from the following description of a particular embodiment given by way of a simple illustratory and non-exhaustive example and from the appended drawings, of which.

DETAILED DESCRIPTION OF ILLUSTRATIVE EMBODIMENTS

1. General Principle

The general principle of an embodiment of the invention, according to a first aspect, consists in adding a DC component to the signals produced by the magnetic head, this DC component being subsequently eliminated before the decoding of the signals, for example by means of capacitors disposed at the input of the standard F/2F decoding circuit.

This DC component makes available a reference signal at the output from the magnetic reading head. This signal is picked up in order to be compared with minimum and/or maximum thresholds in order to detect an attack if any.

Indeed, an attack on the output branches of the magnetic head risks causing a short-circuit between the signals of two output branches or a break in one of the branches and therefore risks modifying the output signal from the reading head, thus activating an alarm when it passes above or below certain threshold values.

Unlike in certain prior-art approaches, an embodiment of the invention enables the detection of not only cuts in tracks but also short-circuits.

Indeed, the presence of a short-circuit will result in zero voltage or a current of very high intensity, thus enabling an alarm to be generated.

Thus, an embodiment of the invention makes it possible to identify any attempt to connect a parasitic device.

It therefore reduces the possibilities of harmful action by an attacker, especially prior to the fraudulent reading of a magnetic card, for example by putting a terminal out of service or in quarantine, or by reporting the attack to the police.

According to a second aspect which, in certain embodiments can be implemented independently of the first aspect referred to here above, an embodiment of the invention also proposes an original solution for protecting by meshing (or shielding, or "wire mesh"). Indeed, unlike in the prior-art solutions which use an independent signal for protecting the output branches of the reading head by meshing, an embodiment of the invention proposes the use of certain output branches of the reading head to protect other output branches.

For example, in the particular case of a reading head compatible with magnetic cards complying with the ISO 7811 standard, since the pieces of information present on the ISO3 track of the card are not confidential, at least one of the two wires of the ISO3 branch of the reading head can be used as a mesh to protect the output branches ISO1 and ISO2.

2. Presentation of a First Embodiment of a Protecting Device According to the Invention Referring now to FIG. 1, we present a first embodiment of a protecting device according to the invention.

Figure 1:
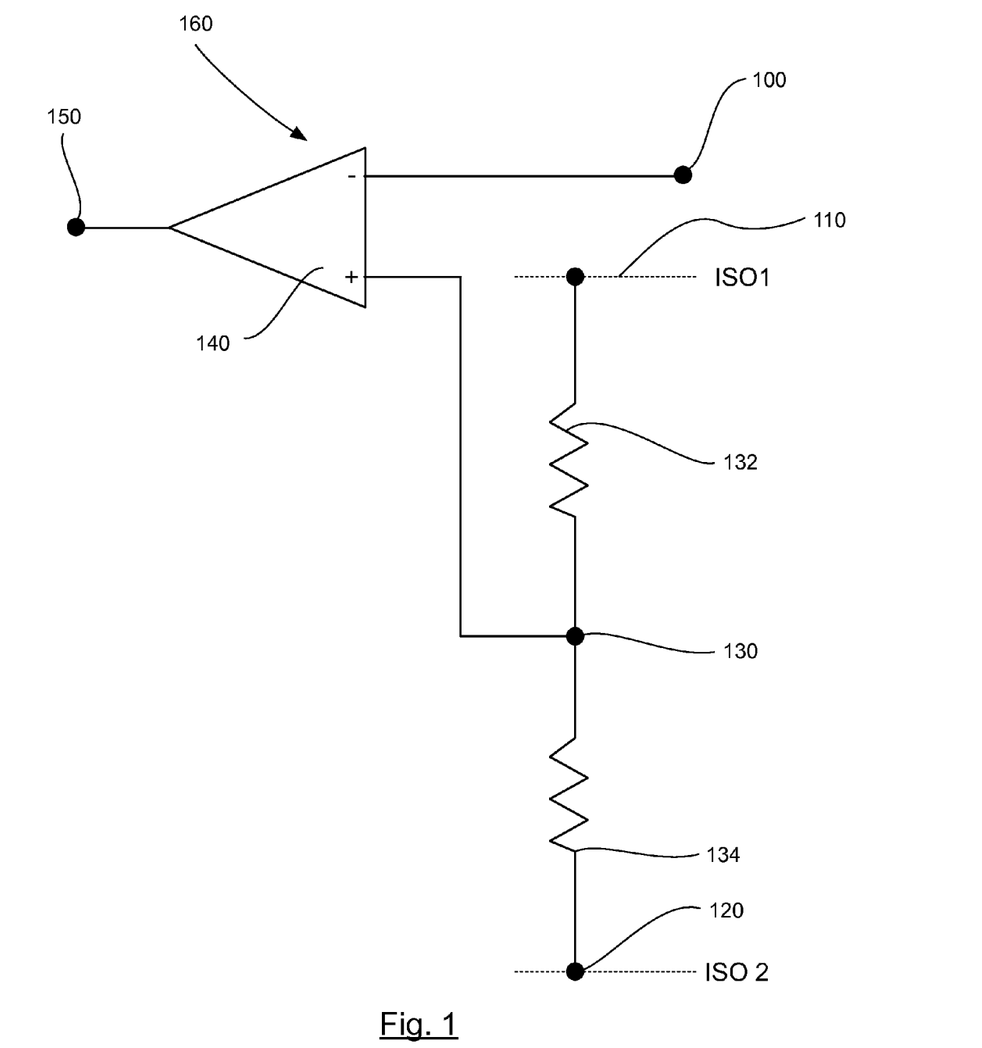
FIG. 1 illustrates a first embodiment of a protecting device according to the invention.

Such a protecting device comprises detection means 160 for detecting a short-circuit between at least two output branches 110 and 120. Here, these are output branches ISO1 and ISO2 of a magnetic reading head capable of reading the magnetic tracks present on a magnetic card complying with the ISO 7811 standard. The device could however be used to confer reliability on the output branches proper to other types of electronic components conveying sensitive data, for example encryption keys.

According to FIG. 1, the detecting means 160 include means 140 for comparing a reference voltage 100 with a voltage measured at an intermediate node 130 of a voltage divider bridge positioned between the output branches 110 and 120. In other embodiments, the detecting means can include means for comparing the intensities of currents representing currents conveyed by the output branches and picked for example by means of current mirrors.

In the particular case presented in FIG. 1, a DC voltage is superimposed on the voltages measured at the output branches. The DC voltage can especially be superimposed permanently, for example by means of a battery.

The divider bridge comprises two resistors 132 and 134. In this way, the voltage of the intermediate node 130 is proportional to the voltage between the two output branches 110 and 120.

The value of the reference voltage 100 can especially be chosen so that in normal operation it is far smaller than the voltage of the intermediate node 130.

In the embodiment illustrated in FIG. 1, the means for comparing are constituted by an operational amplifier 140 mounted as a comparator, an output 150 of which produces an output voltage which differs according to the result of the comparison made.

Thus, when the reference voltage is chosen so as to be always smaller, in normal operation, than the output voltage of the voltage bridge, the output voltage of the comparator 140 will have a maximum value in normal operation and, if the voltage of the intermediate node 150 of the divider bridge gets cancelled out, it will have a minimal value.

When the output branches are biased with voltages of proximate values, the presence of a short-circuit between the output branches 110 and 120 will result in a very low voltage between the two branches and therefore by a very low voltage, proportionally, at the intermediate node 130 of the divider bridge. Consequently, the output voltage of the comparator 140 will then pass from the maximum value to the minimum value. This transition enables the detection of the short-circuit.

In another embodiment, not shown, where no DC voltage is superimposed, the means for comparing can include means making it possible to take account of a phase shift between the reference voltage and the measured voltage.

3. Presentation of a Second Embodiment of a Protecting Device According to the Invention Referring to FIG. 2, we now present a second embodiment of a protecting device according to the invention, which protects one of the output branches of a reading head, in this case the output branch conveying the signals coming from the ISO1 track of a magnetic card according to the ISO 7811 standard. In the particular case of FIG. 2, the output branches are biased with voltages whose values are different.

Figure 2:
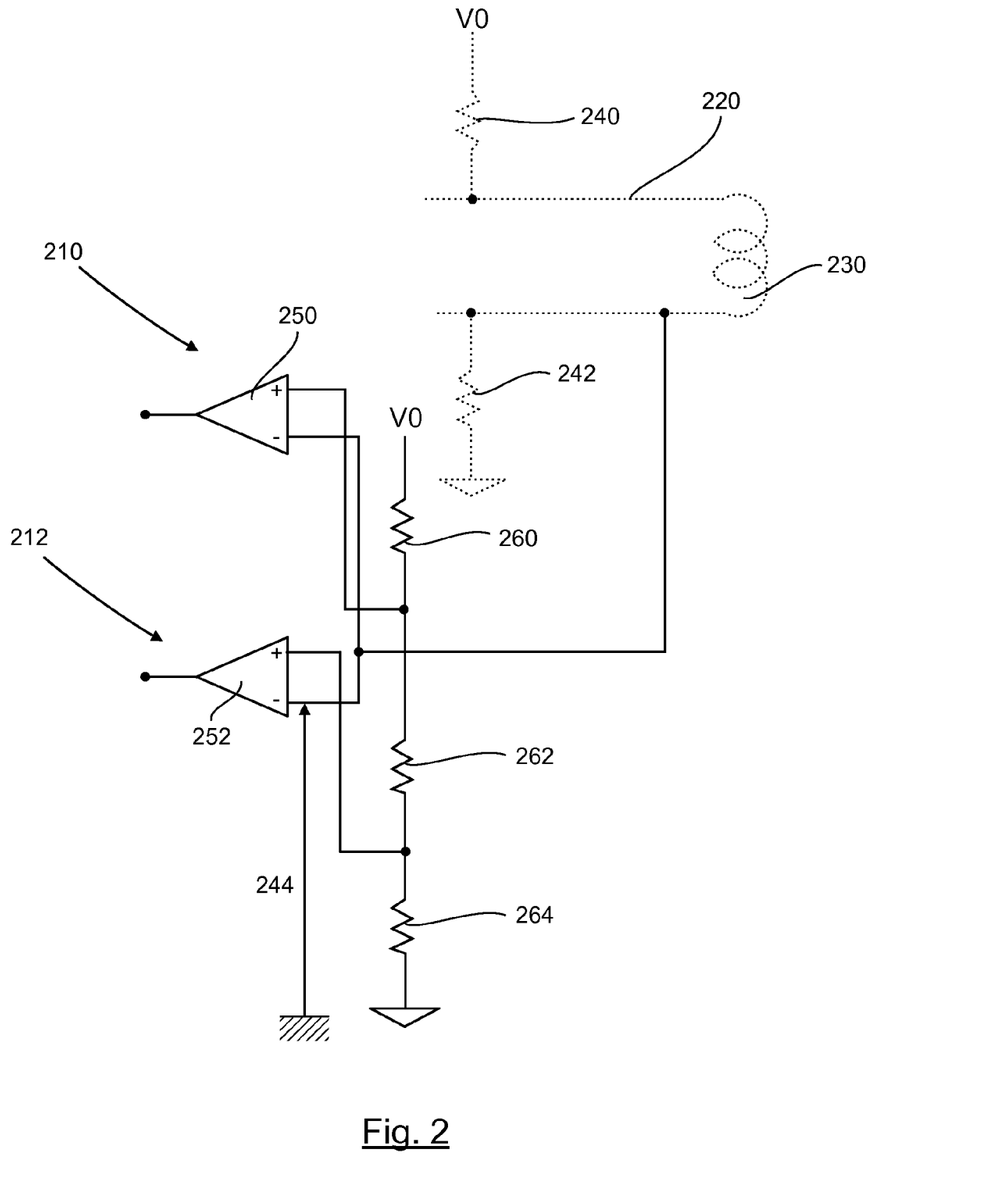
FIG. 2 illustrates a second embodiment of a protecting device according to the invention.

Such a protecting device comprises means 212 for detecting a short-circuit between the output branch 220 and at least one other output branch of the reading head, for example an output branch ISO2.

According to embodiment presented in FIG. 2, the device protecting also includes means 210 for perceiving a deterioration of the output branch 220.

According to FIG. 2, the means 212 for detecting a short-circuit include first means for comparing, for example the comparator 252, and the means 210 for perceiving a deterioration of the output branch 220 include second means for comparing, for example the comparator 250. These first and second means for comparing respectively monitor the voltage of the output branch by comparison with first and second reference voltages.

According to this embodiment of the invention, the detecting means 212 of the device can especially include means for superimposing a DC component on the signal produced by the reading head 230 on the output branch 220. These means for superimposing can consist especially of resistors 240, 242 implanted at input and output of the reading head 230. Thus, according to FIG. 2, a DC voltage equal to V0.R240/(R240+R242) is added to the AC voltage produced by the reading head 230 on the output branch 220 at midpoint of the resistors 220 and 242 to produce a measurement voltage 244.

When the embodiment of the protecting device comprises the generation of a DC component of this kind, it makes it possible for example, through the presence of resistors 260, 262 and 264, to generate a DC reference signal proportional to the DC component and constituting a minimum or maximum threshold serving to activate an alarm.

In the embodiment shown in FIG. 2, the comparator 252 can be used to compare the measurement voltage 244 with a first reference voltage which is a minimum threshold and the comparator 250 can be used to compare the measurement voltage 244 with a second reference voltage which is a maximum threshold.

Thus, in the present embodiment, a short-circuit with another output branch of the reading head 220, for example a branch ISO2 or ISO3, will prompt a variation in the measurement voltage 244. If the value of the measurement voltage 244 becomes smaller than the value of the first reference voltage, the comparator 252 will report an alarm. If it becomes greater than the value of the second reference voltage, the comparator 250 will report an alarm.

A break of the output branch 220 of the reading head 230 will prompt an increase in the value of the measurement voltage 244. Consequently, this value will be greater than the maximum reference voltage of the comparator 250 and this comparator will report an alarm.

Thus, in the particular embodiment illustrated in FIG. 2, the protecting device makes it possible to characterize an attack by the presence of a voltage outside a permissible voltage range determined by the first and second reference voltages, the second reference voltage having a value that is greater, in terms of absolute value, than the value of the first reference voltage.

4. Presentation of a First Embodiment of a Protection Terminal According to the Invention Referring now to FIG. 3, we present an electronic payment terminal comprising means for implementing an embodiment of the invention.

Figure 3:
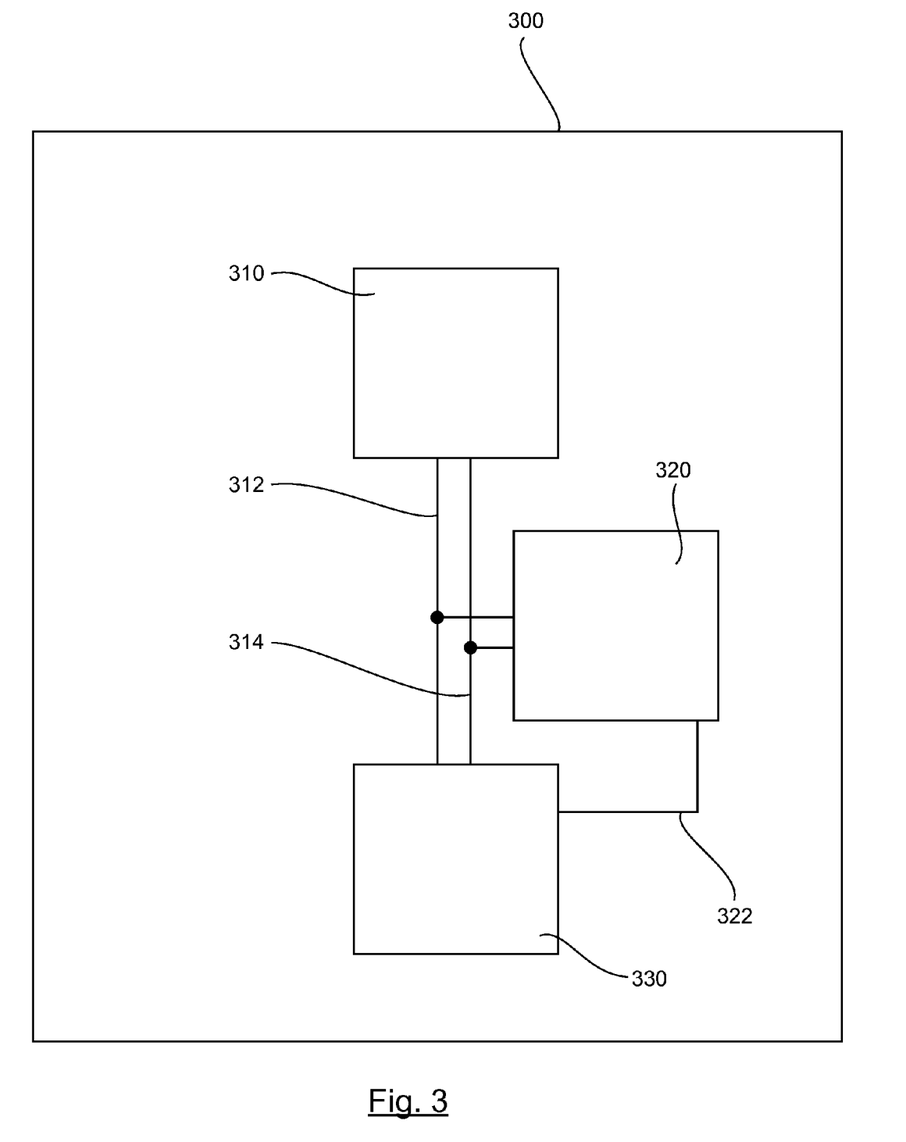
FIG. 3 shows an electronic payment terminal comprising means for implementing the invention.

Such a terminal 300 comprises at least:
a magnetic reading head 310 comprising at least two output branches 312 and 314;
a processing unit 330 comprising means for processing at least one signal produced by the reading head 310 on the output branches 312 and 314;
a protecting device 320 according to an embodiment of the invention.

These different components can for example be implanted on a flexible layer.

The reading head can for example be capable of reading the information present on the tracks of a magnetic card complying with the ISO 7811 standard. In this particular case, an output branch 312 can for example convey a signal read on a track ISO1 of a magnetic card of this kind and another output branch 314 can convey a signal read on a track ISO2 of this magnetic card.

In the embodiment illustrated in FIG. 3, the protecting device 320 is capable of detecting a short-circuit between the output branches 312 and 314 and of highlighting a deterioration in one of the output arms, for example a cutting of one of the arms. In certain particular embodiments of the invention, the protecting device 320 can be included in the processing unit 330.

The means for processing of the processing unit can especially include means for filtering one of the signals conveyed by the branches 312 and 314, for example at least one differential amplifier providing an analog signal and/or means for decoding these signals, for example a F/2F decoder.

In particular, when the embodiment of the protecting device includes means for superimposing a DC component, the means for filtering can especially be capable of eliminating this DC component, for example by means of capacitors implanted at the input of the decoding circuit.

In certain embodiments of the invention, the payment terminal can furthermore comprise means for reacting in the event of detection of a short-circuit or of deterioration in an branch. Certain of these means for reacting can especially be included in the processing unit 330 and/or use other components of the terminal such as a screen, a secured memory, a sound card or a network interface.

In this case, the terminal comprises means of communication 322 between the protecting device and the processing unit 330 capable of transmitting an indication in the event of a short-circuit and/or deterioration of an branch. This can especially be an output voltage of one of the comparators 250 and 252 illustrated in FIG. 2.

According to the modes of implementation of an embodiment of the invention, the means for reacting can comprise at least one of the means belonging to the group comprising:
means for memorizing the attack;
dissuasion means capable of dissuading the insertion of a magnetic card;
means for limiting the capacities of operation of said reading head;
means for generating an alarm on said terminal or towards a controlling third party;
means for sending at least one piece of sensitive data towards a controlling third party.

The means of dissuasion can for example be constituted by means for warning a user of a danger, for example by the display of a warning message on a screen of the terminal or by the activation of a sound alarm. It can also consist of physical means to prevent the insertion of a card, for example a valve which can be positioned so as to close the slot intended for the insertion of the card or a tab which can be positioned in the location intended for the reading of the card.

The means for limiting the capacities of operation of the reading head can for example consist of means for cutting off the electrical power supply to the reading head.

The means for generating an alarm can enable the generation of an alarm, for example in the form of a sound or text on the terminal or at a distance. This alarm can for example be intended for the manufacturer of the terminal or for controlling third parties such as interbank services or police departments.

The alarm can in particular include information to characterize the attack such as the time of the attack.

It can also comprise information helping to remedy such a situation for example by:
- localizing and/or identifying the attacked terminal especially through a serial number and/or a piece of information identifying the manufacturer or a manager of the terminal, and/or
- supplying the identity and/or address of the person in charge of the terminal in being responsible, and/or
- identifying at least one payment card inserted after the attack.

The terminal can also include means for memorizing the attack, for example the positioning of a signaling indicator symbolizing the state of alert of the terminal when the alarm is detected.

Thus, the terminal is especially capable of systematically generating an alarm after each reading of a payment card in order to enable a monitoring of the transactions then performed on this card.

Such a terminal can also include means for putting the terminal back into normal state, the activation of which is subjected for example by a check on the operator's qualification.

Figure 4A:
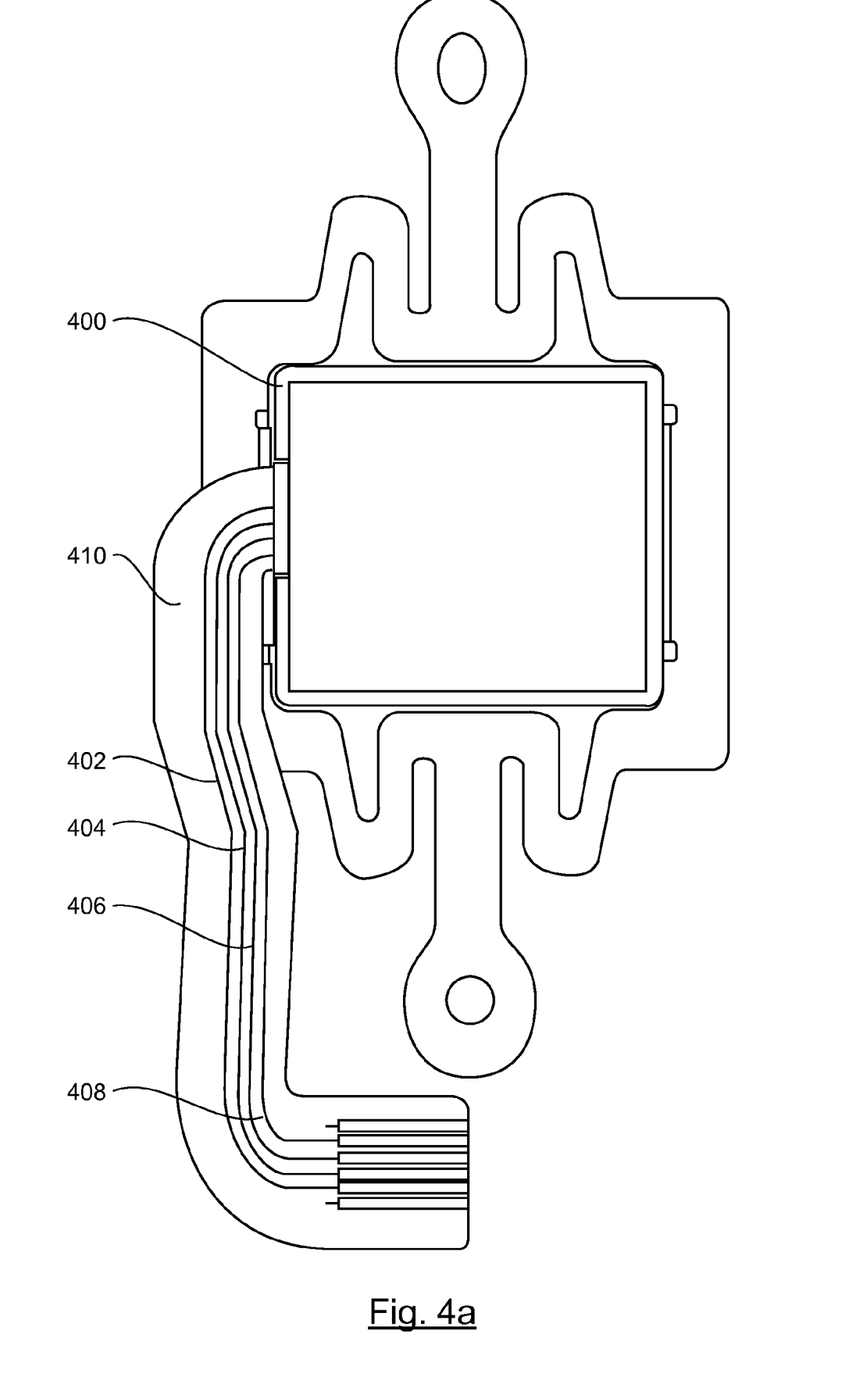
FIG. 4a illustrates a protective mesh according to an embodiment of the invention as seen on the accessible face of the layer of implantation of the components of such a terminal.
Figure 4B:
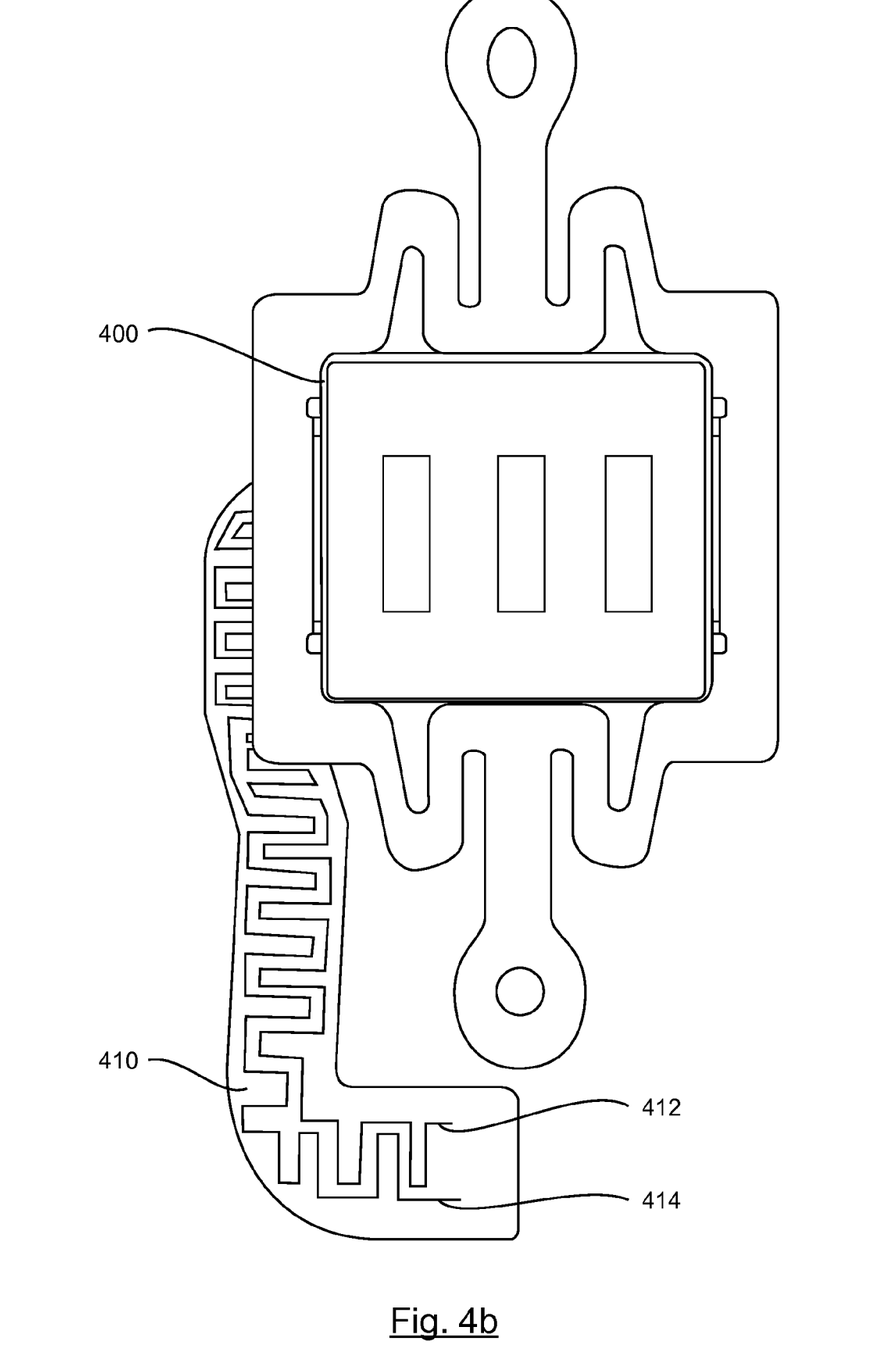
FIG. 4b illustrates the protective mesh of FIG. 4 seen from the concealed face of the layer of implantation of the components.

5. Presentation of a Protection Mesh According to an Embodiment of the Invention Referring now to FIGS. 4 and 5, we present a protection mesh according to an embodiment of the invention.

The prior-art solutions classically protect conductive tracks by covering them with a protective, conductive strip so that an attempt to access the tracks to be protected results in a deterioration of the strip and its conductive properties. Such an attempt can especially consist of a cutting out the strip by scalpel in order to pass through a probe for snooping on signals from the magnetic head.

Contrary to the prior-art solutions which use an independent signal to give the strip a conductive character, an embodiment of the invention proposes to use certain output branches of the reading head to protect other branches.

FIG. 4a illustrates a mesh of this kind, seen from the concealed side, not accessible to a third party, of the layer for implanting components of a terminal as illustrated in FIG. 3, and FIG. 4b presents the same mesh but seen from the accessible face of the layer.

The reading head 400 illustrated in FIGS. 4a and 4b is capable of reading magnetic cards complying with the ISO 7811 standard and therefore comprising three magnetic tracks called ISO1 (or IATA), ISO2 (or ABA) and ISO3 (or THRIFT). Three branches, each intended for transmitting pieces of information contained in one of the tracks ISO1, ISO2 and ISO3, are associated with the reading head 400. Each of these branches consists of a track connected to the input of the reading head and a track, or an output branch, connected to the output of the reading head.

For the sake of simplicity, the "branch ISO1" denotes the branch intended for transmitting information read on the track ISO1, the "branch ISO2" denotes the branch intended for transmitting information read on the track ISO2, and the "branch ISO3" denotes the branch intended for transmitting information read on the track ISO3.

In the embodiment illustrated in FIGS. 4a and 4b, the two wires of the branch ISO3 are used to protect the two wires of the branch ISO1 and ISO2.

In one variant of this embodiment of the invention, only one of the wires of the branch ISO3, for example the output branch, can be used as protection.

In another variant, possibly compatible with the previous variant, only the output branches of the branches ISO1 and ISO2 are protected.

FIG. 4a gives a view of the two wires 402 and 404 of the branch ISO1 and the two wires 406 and 408 of the branch ISO2.

These four wires are placed beneath a protective strip 410 situated on the accessible face designed to keep them unseen and to protect them from malicious physical access.

FIG. 4b gives a view of the two wires 412 and 414 of the branch ISO3 incorporated into the protective strip 410.

In the embodiment illustrated in FIG. 4b, the wires 412 and 414 of the branch ISO3 have convolutions so that a deterioration of the protective strip 410 very probably prompts a break in at least one of the wires 412 and 414.

In other possibly complementary embodiments, at least one of the branches used as protection can be made out of a material of a color identical to the one used for the strip and/or can be implanted between the branches to be protected and the strip so as to be hidden from view and thus maximize the probability of a break of the protection branch in the event of malicious access.

In certain embodiments, it is planned to protect certain branches conveying sensitive information by using, as a protective mesh, branches that do not of themselves convey sensitive information. Thus, in the embodiment illustrated in FIGS. 4a and 4b, the output branch used as a protection mesh is the track ISO3.

6. Other Particular Embodiments of the Terminal of the Invention

According to one particular embodiment of the terminal of the invention, the protecting device can be included in the processing unit of the terminal and one of the output branches protecting certain output branches by meshing can be used as a source of a reference signal for the protecting device.

This reference signal can especially correspond to the first or to the second reference signal of the protecting device.

An exemplary embodiment of the invention provides a terminal for payment by magnetic cards that is more robust against attacks on its magnetic head and makes it possible especially to detect them more reliably by uncovering symptoms that are as yet unknown.

Although the present disclosure has been described with reference to one or more examples, workers skilled in the art will recognize that changes may be made in form and detail without departing from the scope of the disclosure and/or the appended claims.

The invention claimed is:

1. A device including:
  a magnetic reading head having at least two output branches, wherein each of said output branches is configured to convey a signal read by said reading head on a track of a magnetic card; and
  a detecting circuit connected to the at least two output branches and configured to detect a short-circuit between the at least two output branches of the magnetic reading head, wherein said detecting circuit is configured to detect the short-circuit during reading of the tracks of the magnetic card.

2. The device according to claim 1, wherein said detecting circuit includes a comparator connected to compare a signal picked up at said output branches with at least one first reference signal.

3. The device according to claim 1, wherein said detecting circuit includes means for superimposing a DC component on at least one signal generated by said reading head on at least one of said output branches.

4. The device according to claim 3, wherein said means for superimposing enable a permanent superimposing of said DC component.

5. The device according to claim 1, wherein the device furthermore includes means for perceiving a deterioration of at least one output branch of said reading head.

6. The device according to claim 5, wherein said means for perceiving include comparator connected to compare a signal picked up on an output branch with at least one second reference signal.

7. The device according to claim 1, wherein said detecting circuit includes:
- a first comparator connected to compare a signal picked up at said at least two output branches with at least one first reference signal, for detecting the short-circuit between the at least two output branches; and
- a second comparator connected to compare a signal picked up on at least one of the at least two output branches with at least one second reference signal for perceiving a deterioration of the at least one output branch of said reading head, wherein said first and second reference signals take the form of first and second reference voltages, the second reference voltage having a value greater than that of the first reference voltage.

8. An electronic payment terminal including:
- a magnetic reading head provided with at least two output branches, wherein each of said output branches is configured to convey a signal read by said reading head on a track of a magnetic card;
- a processing unit comprising means for processing at least one output signal produced by said reading head; and
- a protecting device connected to the at least two output branches and configured to detect a short-circuit between the at least two output branches of the magnetic reading head, wherein said detecting circuit is configured to detect the short-circuit during reading of the tracks of the magnetic card.

9. The electronic payment terminal according to claim 8 wherein said means for processing comprise means for filtering said generated signal.

10. The electronic payment terminal according to claim 9, wherein said means for filtering are configured to eliminate a DC component from said generated signal.

11. The electronic payment terminal according to claim 8, wherein said at least two output branches are connected to said processing unit and situated on an implantation layer, at least one of said output branches being situated on an accessible face of said implantation layer and being fixedly attached to a protective strip at least partially covering at least one other of said at least two output branches so as to hide said other output branch from view and limit access to said other output branch.

12. The electronic payment terminal according to claim 11, wherein said protecting device is included in said processing unit and said other branch provides a reference signal to said protecting device.

13. A magnetic reading head comprising:
- at least two output branches connecting to a processing unit and situated on an implantation layer, wherein at least one of said output branches is situated on a face accessible to said implantation layer and is fixedly attached to a protective strip at least partially covering at least one other of said at least two output branches so as to keep said other output branch hidden from view and limit access to said other output branch.

* * * * *